United States Patent
Nakagaito et al.

(10) Patent No.: US 9,458,521 B2
(45) Date of Patent: Oct. 4, 2016

(54) HIGH TENSILE STRENGTH GALVANIZED STEEL SHEETS EXCELLENT IN FORMABILITY AND METHODS OF MANUFACTURING THE SAME

(71) Applicant: JFE Steel Corporation, Tokyo (JP)

(72) Inventors: Tatsuya Nakagaito, Tokyo (JP); Shusaku Takagi, Tokyo (JP); Saiji Matsuoka, Tokyo (JP); Shinjiro Kaneko, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/321,989

(22) Filed: Jul. 2, 2014

(65) Prior Publication Data

US 2014/0335374 A1 Nov. 13, 2014

Related U.S. Application Data

(62) Division of application No. 12/682,801, filed as application No. PCT/JP2008/069699 on Oct. 23, 2008, now abandoned.

(30) Foreign Application Priority Data

Oct. 25, 2007 (JP) ................. 2007-277039
Oct. 25, 2007 (JP) ................. 2007-277040

(51) Int. Cl.
| | |
|---|---|
| C23C 2/28 | (2006.01) |
| C21D 8/02 | (2006.01) |
| C21D 8/04 | (2006.01) |
| C21D 9/46 | (2006.01) |
| C21D 9/48 | (2006.01) |
| C22C 38/02 | (2006.01) |
| C22C 38/04 | (2006.01) |
| C22C 38/06 | (2006.01) |
| C23C 2/06 | (2006.01) |
| B32B 15/01 | (2006.01) |
| C23C 30/00 | (2006.01) |
| C21D 1/26 | (2006.01) |
| C22C 38/00 | (2006.01) |
| C22C 38/08 | (2006.01) |
| C22C 38/12 | (2006.01) |
| C22C 38/14 | (2006.01) |
| C22C 38/16 | (2006.01) |
| C22C 38/18 | (2006.01) |
| C22C 38/24 | (2006.01) |
| C22C 38/26 | (2006.01) |
| C22C 38/28 | (2006.01) |
| C22C 38/32 | (2006.01) |
| C22C 38/38 | (2006.01) |

(52) U.S. Cl.
CPC ........... *C21D 8/0263* (2013.01); *B32B 15/013* (2013.01); *C21D 8/04* (2013.01); *C21D 8/0405* (2013.01); *C21D 8/0426* (2013.01); *C21D 8/0436* (2013.01); *C21D 9/46* (2013.01); *C21D 9/48* (2013.01); *C22C 38/02* (2013.01); *C22C 38/04* (2013.01); *C22C 38/06* (2013.01); *C23C 2/06* (2013.01); *C23C 30/00* (2013.01); *C21D 1/26* (2013.01); *C21D 2211/001* (2013.01); *C21D 2211/002* (2013.01); *C21D 2211/005* (2013.01); *C21D 2211/008* (2013.01); *C21D 2211/009* (2013.01); *C22C 38/001* (2013.01); *C22C 38/002* (2013.01); *C22C 38/005* (2013.01); *C22C 38/08* (2013.01); *C22C 38/12* (2013.01); *C22C 38/14* (2013.01); *C22C 38/16* (2013.01); *C22C 38/18* (2013.01); *C22C 38/24* (2013.01); *C22C 38/26* (2013.01); *C22C 38/28* (2013.01); *C22C 38/32* (2013.01); *C22C 38/38* (2013.01); *Y10T 428/12799* (2015.01)

(58) Field of Classification Search
CPC .... B32B 15/013; C21D 8/0263; C21D 8/04; C21D 8/0405
See application file for complete search history.

(56) References Cited

U.S. PATENT DOCUMENTS

| | | | |
|---|---|---|---|
| 2008/0000555 A1 | 1/2008 | Nonaka et al. | |
| 2008/0131305 A1* | 6/2008 | Okitsu | ................. 420/106 |

FOREIGN PATENT DOCUMENTS

| | | | |
|---|---|---|---|
| EP | 1 707 645 A1 | 10/2006 | |
| JP | 6-093340 A | 4/1994 | |
| JP | 11-279691 A | 10/1999 | |
| JP | 2001-192786 A | 7/2001 | |
| JP | 2004-052071 A | 2/2004 | |
| JP | 2005-200690 A | 7/2005 | |
| JP | 2005-307246 A | 11/2005 | |
| JP | 2006-104532 A | 4/2006 | |

OTHER PUBLICATIONS

Shusaku Takagi et al., "Effect of Strain Rates on Strength of Sheet Steels," Iron and Steel, vol. 83, No. 11, 1997, pp. 748-753 (Abstract only).

* cited by examiner

Primary Examiner — Alexander Polyansky
(74) Attorney, Agent, or Firm — DLA Piper LLP (US)

(57) ABSTRACT

A formable galvanized steel sheet includes, in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, and a second phase composed of the martensite, residual austenite, and tempered martensite having an average crystal grain diameter of 3 μm or less, and having a ratio of absorption energy AE to tensile strength TS (AE/TS) not less than 0.063.

7 Claims, No Drawings

HIGH TENSILE STRENGTH GALVANIZED STEEL SHEETS EXCELLENT IN FORMABILITY AND METHODS OF MANUFACTURING THE SAME

TECHNICAL FIELD

This disclosure relates to high tensile strength galvanized steel sheets and methods of making the same, the galvanized steel sheets being excellent in formability and anti-crush properties and used in industrial fields such as automobile and electrical industries.

BACKGROUND

In recent years, from the standpoint of global environment protection, improvement of fuel efficiency of automobiles is an important issue. Therefore, there is a growing tendency to reduce car body weight by increasing the tensile strength and reducing the thickness of the steel sheet composing a car. The increase of the tensile strength of the car body material contributes to the improvement of crush safety, so that high tensile strength steel sheets are increasingly used as car body materials. However, in general cases, the increase of the tensile strength of a steel sheet can result in the deterioration of the ductility of the steel sheet, or the deterioration of formability. Therefore, there is a demand for a galvanized steel sheet having high tensile strength and high formability, and excellent corrosion resistance.

High tensile strength galvanized steel sheets of the multiphase type such as DP (Dual Phase) steel composed of ferrite and martensite, and TRIP (Transformation Induced Plasticity) steel utilizing transformation induced plasticity of residual austenite have been developed to satisfy such a demand.

"Tetsu To Hagane (Irong and Steel)," Vol. 83 (1997), p. 748 describes that ferrite-martensite two-phase steel exhibits excellent anti-crush properties. However, the ferrite-martensite two-phase steel has an r value of less than 1.0, and low deep drawability, so that its applicability is limited.

Japanese Unexamined Patent Application Publication No. 11-279691 proposes a high tensile strength galvannealed steel sheet with good formability, the steel sheet containing, in terms of % by mass, 0.05 to 0.15% of C, 0.3 to 1.5% of Si, 1.5 to 2.8% of Mn, 0.03% or less of P, 0.02% or less of S, 0.005 to 0.5% of Al, 0.0060% or less of N, the remainder being Fe and unavoidable impurities, the elemental composition satisfying (Mn %)/(C %)≥15 and (Si %)/(C %)≥4, and the steel sheet being composed of ferrite containing, in terms of volume fraction, 3 to 20% of martensite and residual austenite. However, these high tensile strength galvanized steel sheets of the composite structure type exhibit high elongation E1 as determined by uniaxial stretching, but have poor stretch-flangeability required for a hole expansion process and the like.

Therefore, Japanese Unexamined Patent Application Publication No. 6-93340 discloses a method for making a high tensile strength galvanized steel sheet with excellent stretch-flangeability. Under the method, a steel sheet composed of, in terms of % by mass, 0.02 to 0.30% of C, 1.5% or less of Si, 0.60 to 3.0% of Mn, 0.20% or less of P, 0.05% or less of S, 0.01 to 0.10% of Al, the remainder being Fe and unavoidable impurities, is subjected to hot rolling at a temperature not lower than the $Ac_3$ transformation point, pickled and cold-rolled, and the steel sheet is heated and maintained at a temperature not lower than the recrystallization temperature and $Ac_1$ transformation point on a continuous annealing galvanizing line. Subsequently, before immersion in a galvanizing bath, the steel sheet is rapidly cooled to the Ms point or lower thereby forming martensite partially or wholly in the steel sheet, and then heated to a temperature not lower than the Ms point and at least equal to the galvanizing bath temperature and galvannealing furnace temperature thereby forming partially or completely tempered martensite.

The high tensile strength galvanized steel sheet described in JP '340 provides excellent stretch-flangeability. However, the product of tensile strength TS and E1 as determined by uniaxial stretching, or the TS-E1 balance of the steel sheet is low. The ratio of yield strength YS to TS, or yield ratio YR (YS/TS) is high, which results in poor formability. In addition, the steel sheet has poor anti-crush properties which are necessary for securing crush safety.

It could therefore be helpful to provide a high tensile strength galvanized steel sheet with excellent formability and a method for making the same, the steel sheet providing a high TS-E1 balance, excellent stretch-flangeability, and a low YR. It could also be helpful to provide a high tensile strength galvanized steel sheet with excellent anti-crush properties and a method for making the same, the steel sheet providing a high TS-E1 balance and excellent stretch-flangeability.

SUMMARY

We provide a formable galvanized steel sheet, including in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, and a second phase composed of the martensite, residual austenite, and tempered martensite having an average crystal grain diameter of 3 μm or less, and having a ratio of absorption energy AE to tensile strength TS (AE/TS) not less than 0.063.

We also provide the formable galvanized steel sheet, including in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, and a second phase composed of the martensite, residual austenite, and tempered martensite having an average crystal grain diameter of 3 μm or less, and having a ratio of absorption energy AE to tensile strength TS (AE/TS) not less than 0.063, further including at least one composition selected from the group consisting of (A) to (C): (A): at least one element selected from the group consisting of, in terms of % by mass, 0.005 to 2.00% of Cr, 0.005 to 2.00% of Mo, 0.005 to 2.00% of Ni, and 0.005 to 2.00% of Cu; (B): in terms of % by mass, 0.0002 to 0.005% of B; and (C): at least one element selected from the group consisting of, in terms of % by mass, 0.001 to 0.005% of Ca and 0.001 to 0.005% of REM.

We further provide the formable galvanized steel sheet, including in terms of % by mass, 0.05 to 0.3% of C, 0.01 to 2.5% of Si, 0.5 to 3.5% of Mn, 0.003 to 0,100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, and a second phase composed of the martensite, residual austenite, and tempered martensite having an average crystal grain diameter of 3 µm or less, and having a ratio of absorption energy AE to tensile strength TS (AE/TS) not less than 0.063, wherein the galvanized steel sheet is a galvannealed steel sheet.

We further yet provide the formable galvanized steel sheet, including in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, and a second phase composed of the martensite, residual austenite, and tempered martensite having an average crystal grain diameter of 3 µm or less, and having a ratio of absorption energy AE to tensile strength TS (AE/TS) not less than 0.063, further including at least one composition selected from the group consisting of (A) to (C): (A): at least one element selected from the group consisting of in terms of % by mass, 0.005 to 2.00% of Cr, 0.005 to 2.00% of Mo, 0.005 to 2.00% of Ni, and 0.005 to 2.00% of Cu; (B): in terms of % by mass, 0.0002 to 0.005% of B; and (C): at least one element selected from the group consisting of, in terms of % by mass, 0.001 to 0.005% of Ca and 0.001 to 0.005% of REM, wherein the galvanized steel sheet is a galvannealed steel sheet.

We still further provide a method of producing a formable galvanized steel sheet including: subjecting a slab having then elemental composition to hot rolling and cold rolling thereby making a cold rolled steel sheet; subjecting the cold rolled steel sheet to annealing including heating the steel sheet in a temperature range from 500° C. to the $Ac_1$ transformation point at an average temperature rising rate of 10° C./s or more; heating and maintaining the steel sheet in a temperature range from the $Ac_1$ transformation point to ($Ac_3$ transformation point+30° C.) for 10 seconds or more; cooling the steel sheet to a temperature range from (Ms point−100° C.) to (Ms point−200° C.) at an average cooling rate of 10° C./s or more; reheating and maintaining the steel sheet in a temperature range from 350 to 600° C. for 1 to 600 seconds; and subjecting the annealed steel sheet to galvanizing treatment.

We also further provide the method of producing a formable galvanized steel sheet including: subjecting a slab having then elemental composition to hot rolling and cold rolling thereby making a cold rolled steel sheet; subjecting the cold rolled steel sheet to annealing including heating the steel sheet in a temperature range from 500° C. to the $Ac_1$ transformation point at an average temperature rising rate of 10° C./s or more; heating and maintaining the steel sheet in a temperature range from the $Ac_1$ transformation point to ($Ac_3$ transformation point+30° C.) for 10 seconds or more; cooling the steel sheet to a temperature range from (Ms point−100° C.) to (Ms point−200° C.) at an average cooling rate of 10° C./s or more; reheating and maintaining the steel sheet in a temperature range from 350 to 600° C. for 1 to 600 seconds; and subjecting the annealed steel sheet to galvanizing treatment, wherein the average temperature rising rate from 500° C. to the $Ac_1$ transformation point is 20° C./s or more.

We also further provide the method of producing a formable galvanized steel sheet including: subjecting a slab having then elemental composition to hot rolling and cold rolling thereby making a cold rolled steel sheet; subjecting the cold rolled steel sheet to annealing including heating the steel sheet in a temperature range from 500° C. to the $Ac_1$ transformation point at an average temperature rising rate of 10° C./s or more; heating and maintaining the steel sheet in a temperature range from the $Ac_1$ transformation point to ($Ac_3$ transformation point+30° C.) for 10 seconds or more; cooling the steel sheet to a temperature range from (Ms point−100° C.) to (Ms point−200° C.) at an average cooling rate of 10° C./s or more; reheating and maintaining the steel sheet in a temperature range from 350 to 600° C. for 1 to 600 seconds; and subjecting the annealed steel sheet to galvanizing treatment, wherein the galvanizing treatment is followed by galvannealing treatment.

We produce a high tensile strength providing a high TS-E1 balance, excellent stretch-flangeability, and excellent anti-crush properties. Through the use of the high tensile strength galvanized steel sheet as an car body, the car has a reduced weight, improved corrosion resistance, and improved crush safety.

DETAILED DESCRIPTION

We discovered high tensile strength galvanized steel sheets with excellent formability providing a high TS-E1 balance (specifically TS×E1≥19000 MPa·%), excellent stretch-flangeability (specifically the below-described hole expansion ratio satisfies λ≥70%), and a low YR (specifically YR<75%) that include:

i) excellent stretch-flangeability, a high TS-E1 balance, and a low YR are achieved with a microstructure having an optimized elemental composition and containing, in terms of area fraction, 20 to 87% of ferrite, 3 to 10% in total of martensite and residual austenite, and 10 to 60% of tempered martensite; and ii) the microstructure is produced through annealing including forced cooling from 750 to 950° C. to a temperature range from (Ms point−100° C.) to (Ms point−200° C.), and then reheating, followed by galvanizing treatment. The Ms point is the temperature at which transformation from austenite to martensite begins, and can be determined from the variation of the coefficient of linear expansion of the steel during cooling.

We thus provide high tensile strength galvanized steel sheets with excellent formability, the steel sheet containing, in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.007% or less of N, the remainder being Fe and unavoidable impurities, and the steel sheet having a microstructure composed of, in terms of area fraction, 20 to 87% of ferrite, 3 to 10% in total of martensite and residual austenite, and 10 to 60% of tempered martensite.

The high tensile strength galvanized steel sheets may further contain one or more elements selected from, in terms of % by mass, 0.005 to 2.00% of Cr, 0.005 to 2.00% of Mo, 0.005 to 2.00% of V, 0.005 to 2.00% of Ni, and 0.005 to 2.00% of Cu. In addition, the steel sheet may further contain one or two elements selected from, in terms of % by mass, 0.01 to 0.20% of Ti and 0.01 to 0.20% of Nb, and one or more elements selected from 0.0002 to 0.005% of B, 0.001 to 0.005% of Ca, and 0.001 to 0.005% of REM.

The high tensile strength galvanized steel sheets may be a galvanized or galvannealed steel sheet.

The high tensile strength galvanized steel sheets may be produced by, for example, a method of making a high tensile strength galvanized steel sheet with excellent formability, including steps of subjecting a slab having the above-described elemental composition to hot rolling and cold rolling thereby making a cold rolled steel sheet, subjecting the cold rolled steel sheet to annealing including steps of heating and maintaining the steel sheet in a temperature range from 750 to 950° C. for 10 seconds or more, cooling the steel sheet from 750° C. to a temperature range from (Ms point−100° C.) to (Ms point−200° C.) at an average cooling rate of 10° C./s or more, and reheating and maintaining the steel sheet in a temperature range from 350 to 600° C. for 1 to 600 seconds, and then subjecting the annealed steel sheet to galvanizing treatment.

Under the method of making a high tensile strength galvanized steel sheet, the galvanizing treatment may be followed by galvannealing treatment.

We produce high tensile strength galvanized steel sheets with excellent formability providing a high TS-El balance, excellent stretch-flangeability, and a low YR. Through the use of the high tensile strength galvanized steel sheet as a car body, the car has a decreased weight, improved corrosion resistance, and improved crush safety.

We also discovered high tensile strength galvanized steel sheets providing a high TS-El balance (specifically TS×El≥19000 MPa·%), excellent stretch-flange-ability (specifically the below-described hole expansion ratio, λ≥70%), and excellent anti-crush properties (specifically the below-described ratio of the absorption energy AE and TS, AE/TS≥0.063), including:

iii) excellent stretch-flangeability, a high TS-El balance, and excellent anti-crush properties are achieved with a microstructure having an optimized elemental composition and containing, in terms of area fraction, 20 to 87% of ferrite, 3 to 10% in total of martensite and residual austenite, and 10 to 60% of tempered martensite, the second phase composed of the martensite, residual austenite, and tempered martensite having an average crystal grain diameter of 3 μm or less; and iv) the microstructure is produced through annealing including steps of heating the steel sheet in a temperature range from 500° C. to the Ac$_1$ transformation point at an average temperature rising rate of 10° C./s or more, heating and maintaining the steel sheet in a temperature range from the Ac$_1$ transformation point to (Ac$_3$ transformation point+30° C.) for 10 seconds or more thereby forming more fine austenite through transformation, forcedly cooling the steel sheet to a temperature range from (Ms point−100° C.) to (Ms point−200° C.) at an average cooling rate of 10° C./s or more, and reheating the steel sheet, and then subjecting the annealed steel sheet to galvanizing treatment. The Ms point is the temperature at which transformation from austenite to martensite begins, and can be determined from the variation of the coefficient of linear expansion of the steel during cooling.

We thus provide high tensile strength galvanized steel sheets with excellent formability and anti-crush properties, the steel sheets containing, in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, in addition, 0.01 to 0.2% in total of at least one element selected from Ti, Nb, and V, the remainder being Fe and unavoidable impurities, the steel sheets having a microstructure composed of, in terms of area fraction, 20 to 87% of ferrite, 3 to 10% in total of martensite and residual austenite, and 10 to 60% of tempered martensite, and the second phase composed of the martensite, residual austenite, and tempered martensite having an average crystal grain diameter of 3 vim or less.

The high tensile strength galvanized steel sheets may further contain one or more elements selected from, in terms of % by mass, 0.005 to 2.00% of Cr, 0.005 to 2.00% of Mo, 0.005 to 2.00% of Ni, and 0.005 to 2.00% of Cu. In addition, as necessary, the steel sheets may further contain one or more elements selected from, in terms of % by mass, 0.0002 to 0.005% of B, 0.001 to 0.005% of Ca, and 0.001 to 0.005% of REM.

The high tensile strength galvanized steel sheets may be a galvanized or galvannealed steel sheet.

The high tensile strength galvanized steel sheets may be produced by, for example, a making method including steps of subjecting a slab having the above-described elemental composition to hot rolling and cold rolling thereby making a cold rolled steel sheet, subjecting the cold rolled steel sheet to annealing including steps of heating the steel sheets in a temperature range from 500° C. to the Ac$_1$ transformation point at an average temperature rising rate of 10° C./s or more, heating and maintaining the steel sheets in a temperature range from the Ac$_1$ transformation point to (Ac$_3$ transformation point+30° C.) for 10 seconds or more, cooling the steel sheets to a temperature range from (Ms point−100° C.) to (Ms point−200° C.) at an average cooling rate of 10° C./s or more, and reheating and maintaining the steel sheets in a temperature range from 350 to 600° C. for 1 to 600 seconds, and then subjecting the annealed steel sheets to galvanizing treatment.

The galvanizing treatment may be followed by galvannealing treatment.

Details of the steel sheets and methods are described below. The "%" expressing the content of an element means "% by mass" unless otherwise stated.

1) Elemental Composition

C: 0.05 to 0.3%

C is an element stabilizing austenite, and necessary for forming the second phase such as martensite other than ferrite thereby increasing the TS and improving the TS-El balance. If the C content is less than 0.05%, formation of the second phase other than ferrite is inhibited, and thus the TS-El balance deteriorates. On the other hand, if the C content is more than 0.3%, the weldability deteriorates. Accordingly, the C content is from 0.05 to 0.3%, preferably from 0.08 to 0.15%.

Si: 0.01 to 2.5%

Si is an element effective at solute strengthening steel thereby improving the TS-El balance. The Si content must be 0.01% or more to achieve this. If the Si content is more than 2.5%, El deteriorates and the surface quality and weldability deteriorate. Accordingly, the Si content is from 0.01 to 2.5%, preferably from 0.7 to 2.0%.

Mn: 0.5 to 3.5%

Mn is an element effective at strengthening steel, and promoting the formation of the second phase such as martensite. The Mn content must be 0.01% or more to achieve this. On the other hand, if the Mn content is more than 3.5%, the ductility of ferrite markedly deteriorates due to the excessive increase in the size of the second phase and solute strengthening, which results in the deterioration of formability. Accordingly, the Mn content is from 0.5 to 3.5%, preferably from 1.5 to 3.0%.

P: 0.003 to 0.100%

P is an element effective at strengthening steel. The P content must be 0.003 or more to achieve this. On the other hand, if the P content is more than 0.100%, the steel is embrittled by grain boundary segregation, which results in the deterioration of the anti-crush properties. Accordingly, the P content is from 0.003 to 0.100%.

S: 0.02% or Less

S occurs as an intervening substance such as MnS, and deteriorates the anti-crush properties and weldability. Therefore, the Si content is preferably as low as possible. However, from the viewpoint of production cost, the S content is 0.02% or less.

Al: 0.010 to 1.5%

Al is an element effective at forming ferrite thereby improving the TS-El balance. The Al content must be 0.010% or more to achieve this. On the other hand, if the Al content is more than 1.5%, slab cracking tends to occur during continuous casting. Accordingly, the Al content is from 0.010 to 1.5%.

N: 0.007% or Less

N is an element deteriorating the aging resistance of the steel. If the N content is more than 0.007%, the aging resistance markedly deteriorates. Accordingly, the N content is 0.007% or less, and is preferably as low as possible.

at Least One Selected from Ti, Nb, and V: 0.01 to 0.2% in Total

Ti, Nb, and V are elements which precipitate in the forms of, for example, TiC, NbC, and VC, and are effective at refining the steel structure. The total content of the at least one element selected from Ti, Nb, and V must be 0.01% or more to achieve this. On the other hand, if the total content of the at least one element selected from Ti, Nb, and V is more than 0.2%, excessive precipitation occurs, which results in the deterioration of the ductility of ferrite. Accordingly, the total content of the at least one element selected from Ti, Nb, and V is from 0.01 to 0.2%.

The remainder is composed of Fe and unavoidable impurities, and as necessary may further contain, for the below-described reason, 0.005 to 2.00% of Cr, 0.005 to 2.00% of Mo, 0.005 to 2.00% of V, 0.005 to 2.00% of Ni, 0.005 to 2.00% of Cu, 0.01 to 0.20% of Ti, 0.01 to 0.20% of Nb, 0.0002 to 0.005% of B, 0.001 to 0.005% of Ca, and 0.001 to 0.005% of REM. Cr, Mo, V, Ni, and Cu: 0.005 to 2.00% each Cr, Mo, V, Ni, and Cu are elements effective at inhibiting the formation of perlite during cooling from the heating temperature in annealing, and promoting the formation of martensite and other phases thereby reinforcing the steel. The content of the at least one element selected from Cr, Mo, V, Ni, and Cu must be 0.005% to achieve this. On the other hand, if the respective contents of Cr, Mo, V, Ni, and Cu are more than 2.00%, the effect is saturated, which results in an increase in cost. Accordingly, the respective contents of Cr, Mo, V, Ni, and Cu are from 0.005 to 2.00%.

Ti and Nb: 0.01 to 0.20% Each

Ti and Nb are elements effective at forming carbonitrides, and increasing the tensile strength of the steel through precipitation strengthening. The content of the at least one element selected from Ti and Nb must be 0.01% or more to achieve this. On the other hand, if the respective contents of Ti and Nb are more than 0.20%, the tensile strength is excessively increased, which results in the deterioration of ductility. Accordingly, the respective contents of Ti and Nb are from 0.01 to 0.20%.

B: 0.0002 to 0.005%

B is an element effective at inhibiting the formation of ferrite from the austenite grain boundary, and forming a second phase such as martensite to increase the tensile strength of the steel. The B content must be 0.0002% or more to achieve this. On the other hand, if the B content is more than 0.005%, the effect is saturated, which results in an increase in cost. Accordingly, the B content is from 0.0002 to 0.005%.

Ca, REM: 0.001 to 0.005% Each

Ca and REM are elements effective at improving formability through the control of the sulfide form. The content of the at least one element selected from Ca and REM must be 0.001% or more to achieve this. On the other hand, if the respective contents of Ca and REM are more than 0.005%, steel cleanness may be affected. Accordingly, the respective contents of Ca and REM are from 0.001 to 0.005%.

2) Microstructure

Area Fraction of Ferrite: 20 to 87%

Ferrite improves the TS-El balance.

To satisfy TS×El≥19000 MPa·%, the area fraction of ferrite must be 20% or more, preferably 50% or more. As described below, the total area fraction of martensite and residual austenite is 3% or more, and the area fraction of tempered martensite is 10% or more, so that the upper limit of the area fraction of ferrite is 87%.

Total Area Fraction of Martensite and Residual Austenite: 3 to 10%

Martensite and residual austenite contribute to reinforcement of the steel, improve the TS-El balance, and decrease the YR. The total area fraction of martensite and residual austenite must be 3% or more to achieve this. However, if the total area fraction of martensite and residual austenite is more than 10%, the stretch-flangeability deteriorates. Therefore, the total area fraction of martensite and residual austenite is from 3 to 10%.

Area Fraction of Tempered Martensite: 10 to 60%

Tempered martensite affects the stretch-flangeability less than martensite before tempering or residual austenite, so that an effective second phase is formed achieving high tensile strength while maintaining excellent stretch-flangeability satisfying λ≥50%. The area fraction of tempered martensite must be 10% or more to achieve this. However, if the area fraction of tempered martensite is more than 60%, TS×El≥19000 MPa·% is not satisfied. Accordingly, the area fraction of tempered martensite is from 10 to 60%.

Average Crystal Grain Diameter of Second Phase Composed of Martensite, Residual Austenite, and Tempered Martensite: 3 µm or Less The presence of the second phase composed of martensite, residual austenite, and tempered martensite effectively improves the anti-crush properties. In particular, when the average crystal grain diameter of the second phase is 3 µm or less, AE/TS≥0.063 is satisfied. Accordingly, the average crystal grain diameter of the second phase composed of martensite, residual austenite, and tempered martensite is preferably 3 µm or less.

In addition to martensite, residual austenite, and tempered martensite, the second phase may further contain perlite and bainite. Good results are achieved as long as the above-described area fractions of ferrite, martensite, residual austenite, and tempered martensite, and the average crystal grain diameter of the second phase are satisfied. From the viewpoint of stretch-flangeability, the area fraction of perlite is preferably 3% or less.

The area fractions of ferrite, martensite, residual austenite, and tempered martensite refer to the proportions of the respective phases in the observed area, and were determined as follows: a section of a steel sheet in the thickness direction was polished, corroded with 3% nital, the quarter-thickness position was observed with an SEM (scanning electron microscope) under a magnification of 1000× to 3000×, and the area fraction was calculated using commercial image processing software. The total area of the second phase composed of martensite, residual austenite, and tempered martensite was divided by the total number of second phase grains to calculate the average area of one second phase grain, and its square root was used as the average crystal grain diameter of the second phase.

3) Production Conditions 1

The high tensile strength galvanized steel sheets may be produced by, for example, a method including steps of subjecting a slab having the above-described elemental composition to hot rolling and cold rolling thereby making a cold rolled steel sheet, subjecting the cold rolled steel sheet to annealing including steps of heating and maintaining the steel sheet in a temperature range from 750 to 950° C. for 10 seconds or more, cooling the steel sheet from 750° C. to a temperature range from (Ms point−100° C.) to (Ms point−200° C.) at an average cooling rate of 10° C./s or more, and reheating and maintaining the steel sheet in a temperature range from 350 to 600° C. for 1 to 600 seconds, and then subjecting the annealed steel sheet to galvanizing treatment.

Heating Conditions During Annealing: Temperature Range from 750 to 950° C. For 10 Seconds or More If the heating temperature during annealing is lower than 750° C., or the maintaining period is less than 10 seconds, austenite is insufficiently formed, so that the second phase such as martensite is insufficiently formed by subsequent cooling. On the other hand, if the heating temperature is higher than 950° C., austenite is coarsened, whereby formation of ferrite during cooling is inhibited, and the area fraction of ferrite falls short of 20%. Accordingly, heating temperature during annealing is maintained in a temperature range from 750 to 950° C. for 10 seconds or more. The upper limit of the maintaining period is not particularly defined. However, even if the heating temperature is maintained for 600 seconds or more, the effect is saturated, which results in an increase in cost. Accordingly, the maintaining period is preferably less than 600 seconds.

Cooling Conditions During Annealing: from 750° C. To a Temperature Range from (Ms Point−100° C.) to (Ms Point−200° C.) at an Average Cooling Rate of 10° C./s or More After heating, the steel sheet must be cooled from 750° C. at an average cooling rate of 10° C./s or more. If the average cooling rate is less than 10° C./s, perlite is formed in large amounts, so that necessary amounts of tempered martensite, martensite, and residual austenite cannot be obtained. The upper limit of the cooling rate is not particularly defined, but is preferably 200° C./s or less to prevent deterioration of the shape of the steel sheet, and to avoid difficulty regarding stopping of cooling within the temperature range from (Ms point−100° C.) to (Ms point−200° C.). The temperature at which cooling is stopped is one of the most important factors for controlling the amounts of martensite, residual austenite, and tempered martensite formed by the subsequent reheating, galvanizing, and galvannealing of the coated phase. More specifically, the amounts of martensite and untransformed martensite are determined when cooling is stopped, and the subsequent heat treatment transforms martensite into tempered martensite, and untransformed austenite into martensite or residual austenite, whereby the strength, TS-El balance, stretch-flangeability, and YR of the steel are determined. If the temperature at which cooling is stopped is higher than (Ms point−100° C.), martensite is insufficiently transformed, so that the amount of untransformed austenite increases, and the total area fraction of martensite and residual austenite exceeds 10%, which results in the deterioration of the stretch-flangeability. On the other hand, if the temperature at which cooling is stopped is lower than (Ms point−200° C.), most of austenite is transformed into martensite, the amount of untransformed austenite decreases, and the total area fraction of martensite and residual austenite is below 3%, which results in the deterioration of the TS-El balance and increase of the YR. Accordingly, the cooling treatment during annealing must be carried out from 750° C. to a temperature range from (Ms point−100° C.) to (Ms point−200° C.) at an average cooling rate of 10° C./s or more.

Reheating Conditions During Annealing: Temperature Range from 350 to 600° C. for 1 to 600 seconds After cooling to the temperature range from (Ms point−100° C.) to (Ms point−200° C.) at an average cooling rate of 10° C./s or more, reheating is carried out, and a temperature range from 350 to 600° C. is maintained for 1 second or more to temper the martensite formed during cooling thereby forming tempered martensite at an area fraction of 10 to 60%. As a result of this, high tensile strength is achieved and excellent stretch-flangeability is maintained. If the reheating temperature is below 350° C. or the maintaining period is less than 1 second, the area fraction of the tempered martensite is less than 10%, which results in the deterioration of the stretch-flangeability. On the other hand, if the reheating temperature is higher than 600° C. or the maintaining period is more than 600 seconds, the untransformed austenite formed during cooling is transformed into perlite or bainite, and finally the total area fraction of martensite and residual austenite is less than 3%, which results in the deterioration of the TS-El balance or the increase of the YR. Accordingly, the reheating temperature during annealing must be maintained within a temperature range from 350 to 600° C. for 1 to 600 seconds.

Other conditions of the production method are not particularly limited, but are preferably the following conditions.

The slab is preferably produced by a continuous casting process to prevent macro segregation, and may be produced by an ingot casting or thin slab casting process. Hot rolling of the slab may be carried out by once cooling the slab to room temperature, followed by reheating, or by charging the slab into a heating furnace without cooling the slab to room temperature. Alternatively, an energy saving process may be used, wherein the slab is slightly insulated, and then subjected to hot rolling. When the slab is heated, the heating temperature is preferably 1100° C. or higher to dissolve the carbide and prevent the increase of the rolling load. Further, to prevent the increase of scale loss, the heating temperature for the slab is preferably 1300° C. or lower.

During hot rolling of the slab, from the viewpoint of securing the rolling temperature, the rough bar after rough rolling may be heated. Alternatively, a so-called "continuous rolling" process may be used, wherein two rough bars are joined together, and subjected to continuous finish rolling. To prevent the deterioration of formability after cold rolling and annealing, and the formation of a band structure which can increase the anisotropy, the finish rolling is carried out at a temperature not lower than the $Ar_3$ transformation point.

Further, to reduce the rolling load and improve the uniformity of the shape and material, lubrication rolling is preferably carried out in the whole or partial path of finish rolling thereby giving a coefficient of friction of 0.10 to 0.25.

From the viewpoints of temperature control and prevention of decarbonization, the steel sheet after hot rolling is preferably wound up at a temperature of 450 to 700° C.

The wound steel sheet is subjected to pickling thereby removing scales, and then cold rolling at a rolling ratio of preferably 40% or more. Subsequently, the steel sheet is annealed under the above-described conditions, and then galvanized.

The galvanizing treatment is carried out by immersing the steel sheet in a galvanizing bath at 440 to 500° C. containing 0.12 to 0.22% of Al (when no galvannealing is involved) or 0.08 to 0.18% of Al (when followed by galvannealing), and then the coating weight is adjusted by, for example, gas wiping. The galvanizing treatment may be followed by galvannealing treatment at 450 to 600° C. for 1 to 30 seconds.

The galvanized steel sheet or galvannealed steel sheet may be subjected to temper rolling for the purpose of shape correction or adjustment of surface roughness. Further, various coating treatments such as resin or oil coating may be applied.

4) Production Conditions 2

The high tensile strength galvanized steel sheet may be produced by, for example, a method including steps of subjecting a slab having the above-described elemental composition to hot rolling and cold rolling thereby making a cold rolled steel sheet, subjecting the cold rolled steel sheet to annealing including steps of heating the steel sheet to a temperature range from 500° C. to $Ac_1$ transformation point at an average temperature rising rate of 10° C./s or more, heating and maintaining the steel sheet in a temperature range from $Ac_1$ transformation point to ($Ac_3$ transformation point+30° C.) for 10 seconds or more, cooling the steel sheet from 750° C. to a temperature range from (Ms point−100° C.) to (Ms point−200° C.) at an average cooling rate of 10° C./s or more, and reheating and maintaining the steel sheet in a temperature range from 350 to 600° C. for 1 to 600 seconds, and then subjecting the annealed steel sheet to galvanizing treatment.

Temperature Rising Conditions During Annealing: Temperature Rising in a Temperature Range from 500° C. to $Ac_1$ Transformation Point at a Temperature Rising Rate of 10° C./s or More The temperature rising rate during annealing is an important factor for refining the average crystal grain diameter of the second phase composed of martensite, residual austenite, and tempered martensite. In the steel having the elemental composition, fine carbides of Ti, Nb, and V inhibit recrystallization. When the temperature is risen in a temperature range from 500° C. to $Ac_1$ transformation point at an average temperature rising rate of 10° C./s or more, the steel sheet is heated to the subsequent temperature range from the $Ac_1$ transformation point with little recrystallization. Therefore, during heating, the uncrystallized ferrite causes austenite transformation to form fine austenite. As a result, the second phase after cooling and reheating has an average crystal grain diameter of 3 μm or less, whereby excellent anti-crush properties satisfying AE/TS≥0.063 are achieved. On the other hand, if the average temperature rising rate in the temperature range from 500° C. to $Ac_1$ transformation point is less than 10° C./s, recrystallization occurs during temperature rising in the temperature range from 500° C. to $Ac_1$ transformation point, and the recrystallized ferrite causes austenite transformation after grain growth to a degree. As a result, austenite is not refined, and the average crystal grain diameter of the second phase cannot be 3 μm or less. Accordingly, it is necessary to rise the temperature in the temperature range from 500° C. to $Ac_1$ transformation point at an average temperature rising rate of 10° C./s or more, preferably 20° C./s or more.

Heating Conditions During Annealing: Temperature Range from $Ac_1$ Transformation Point to ($Ac_3$ Transformation Point+30° C.) for 10 Seconds or More If the heating temperature during annealing is below the $Ac_1$ transformation point, or the maintaining period is less than 10 seconds, formation of austenite does not occur, or insufficiently occurs, so that a sufficient amount of second phase such as martensite cannot be secured by subsequent cooling. On the other hand, if the heating temperature is higher than ($Ac_3$ transformation point+30° C.), austenite grains markedly grow, whereby refinement of austenite is inhibited. In addition, the growth of austenite grains inhibits formation of ferrite during cooling, so that the area fraction of ferrite cannot be 20% or more. Accordingly, the heating treatment during annealing must be carried out in a temperature range from $Ac_1$ transformation point to ($Ac_3$ transformation point+30° C.) for 10 seconds or more. From the viewpoints of inhibition of austenite coarsening and energy cost, the maintaining period is preferably 300 seconds or less.

Cooling Conditions During Annealing: Cooling from the Heating Temperature to a Temperature Range from (Ms Point−100° C.) to (Ms Point−200° C.) at an Average Cooling Rate of 10° C./s or More After the heating treatment, the steel sheet must be cooled from the heating temperature at an average cooling rate of 10° C./s or more. If the average cooling rate is below 10° C./s, perlite is heavily formed, so that necessary amounts of tempered martensite, martensite, and residual austenite cannot be obtained. The upper limit of the cooling rate is not particularly defined, but is preferably 200° C./s or less to prevent deterioration of the shape of the steel sheet, and avoid difficulty at stopping cooling within the temperature range from (Ms point−100° C.) to (Ms point−200° C.).

The temperature at which cooling is stopped is one of the most important factors for controlling the amounts of martensite, residual austenite, and tempered martensite formed by the subsequent reheating, galvanizing, and galvannealing of the coated phase. More specifically, the amounts of martensite and untransformed martensite are determined when cooling is stopped, and the subsequent heat treatment transforms martensite into tempered martensite, and untransformed austenite into martensite or residual austenite, whereby the strength, TS-E1 balance, stretch-flangeability, and YR of the steel are determined. If the cooling treatment is stopped at a temperature higher than (Ms point−100° C.), martensite is insufficiently transformed, so that the amount of untransformed austenite increases, and the total area fraction of martensite and residual austenite exceeds 10%, which results in the deterioration of the stretch-flangeability. On the other hand, if the cooling temperature is stopped at a temperature lower than (Ms point−200° C.), most of austenite is transformed into martensite, the amount of untransformed austenite decreases, and the total area fraction of martensite and residual austenite is below 3%, which results in the deterioration of the TS-E1 balance. Accordingly, the cooling treatment during annealing must be carried out from the heating temperature to a temperature range from (Ms point−100° C.) to (Ms point−200° C.) at an average cooling rate of 10° C./s or more.

Reheating Conditions During Annealing: Temperature Range from 350 to 600° C. for 1 to 600 Seconds After cooling to the temperature range from (Ms point−100° C.) to (Ms point−200° C.) at an average cooling rate of 10° C./s or more, reheating is carried out, and a temperature range from 350 to 600° C. is maintained for 1 second or more to temper the martensite formed during cooling thereby forming tempered martensite at an area fraction of 10 to 60%. As a result, high tensile strength is achieved with excellent stretch-flangeability maintained. If the reheating temperature is below 350° C. or the maintaining period is less than 1 second, the area fraction of the tempered martensite is less than 10%, which results in the deterioration of the stretch-flangeability. On the other hand, if the reheating temperature is higher than 600° C. or the maintaining period is more than 600 seconds, the untransformed austenite formed during cooling is transformed into perlite or bainite, and finally the total area fraction of martensite and residual austenite is less than 3%, which results in the deterioration of the TS-E1 balance. Accordingly, the reheating temperature during annealing must be maintained within a temperature range from 350 to 600° C. for 1 to 600 seconds.

Other conditions of the production method are not particularly limited, but are preferably the following conditions.

The slab is preferably produced by a continuous casting process to prevent macro segregation, and may be produced by an ingot casting or thin slab casting process. Hot rolling of the slab may be carried out by once cooling the slab to room temperature, followed by reheating, or by charging the slab into a heating furnace without cooling the slab to room temperature. Alternatively, an energy saving process may be used, wherein the slab is slightly insulated, and then subjected to hot rolling. When the slab is heated, the heating temperature is preferably 1100° C. or higher to dissolve the carbide and prevent the increase of the rolling load. Further, the heating temperature for the slab is preferably 1300° C. or lower to prevent the increase of scale loss.

During hot rolling of the slab, from the viewpoint of securing the rolling temperature, the rough bar after rough rolling may be heated. Alternatively, a so-called "continuous rolling" process may be used, wherein two rough bars are joined together, and subjected to continuous finish rolling. To prevent the deterioration of formability after cold rolling and annealing, and the formation of a band structure which can increase the anisotropy, the finish rolling is carried out at a temperature not lower than the $Ar_3$ transformation point. Further, to reduce the rolling load and improve the uniformity of the shape and material, lubrication rolling is preferably carried out in the whole or partial path of finish rolling thereby giving a coefficient of friction of 0.10 to 0.25.

From the viewpoints of temperature control and prevention of decarbonization, the steel sheet after hot rolling is preferably wound up at a temperature of 450 to 700° C.

The wound steel sheet is subjected to pickling thereby removing scales, and then cold rolling at a rolling ratio of preferably 40% or more. Subsequently, the steel sheet is annealed under the above-described conditions, and then galvanized.

The galvanizing treatment is carried out by immersing the steel sheet in a galvanizing bath at 440 to 500° C. containing 0.12 to 0.22% of Al (when no galvannealing is involved) or 0.08 to 0.18% of Al (when followed by galvannealing), and then the coating weight is adjusted by, for example, gas wiping. The galvanizing treatment may be followed by galvannealing treatment at 450 to 600° C. for 1 to 30 seconds.

The galvanized steel sheet or galvannealed steel sheet may be subjected to temper rolling for the purpose of shape correction or adjustment of surface roughness. Further, various coating treatments such as resin or oil coating may be applied.

EXAMPLES

Example 1

The steels A to S having the elemental compositions shown in Table 1 were ingoted by a converter, made into slabs by a continuous casting process. Subsequently, the slabs were subjected to hot rolling at a finish temperature of 900° C. to give a thickness of 3.0 mm, cooled at a cooling rate of 10° C./s, and then wound up at a temperature of 600° C. Subsequently, after pickling, the slabs were subjected to cold rolling to give a thickness of 1.2 mm, and annealed on a continuous galvanizing line under the conditions shown in Tables 2 and 3. Thereafter, the steel sheets were immersed in a galvanizing bath at 460° C. to form a coating at a coating weight of 35 to 45 g/m², subjected to galvannealing treatment at 520° C., and cooled at a cooling rate of 10° C./s to make galvanized steel sheets 1 to 44. As shown in Tables 2 and 3, some galvanized steel sheets were not subjected to galvannealing treatment. The galvanized steel sheets thus obtained were measured for the area fractions of ferrite, martensite, residual austenite, and tempered martensite by the above-described method. Further, JIS No. 5 tensile test specimens were cut out along and perpendicular to the rolling direction, and subjected to tensile test according to JIS Z 2241. Further, test specimens of 150 mm×150 mm were cut out, and subjected to hole expansion test three times according to JFS T 1001 (Japan Iron and Steel Federation standard) to determine the average hole expansion ratio λ(%), whereby the stretch-flangeability was evaluated.

The results are shown in Tables 4 and 5, indicating that all of our galvanized steel sheets satisfied TSE1≥19000 MPa·%, hole expansion ratio λ≥70, and YR<75%, representing their high TS-E1 balance, excellent stretch-flangeability, and low YR.

TABLE 1

| | Elemental composition (% by mass) | | | | | | | | | | | | | | | | |
|---|---|---|---|---|---|---|---|---|---|---|---|---|---|---|---|---|---|
| Steel | C | Si | Mn | P | S | Al | N | Cr | Mo | V | Ni | Cu | Ti | Nb | B | Ca | REM | Note |
| A | 0.06 | 1.0 | 2.3 | 0.020 | 0.003 | 0.035 | 0.003 | — | — | — | — | — | — | — | — | — | — | Within the scope of our methods |
| B | 0.12 | 1.5 | 2.0 | 0.015 | 0.002 | 0.037 | 0.002 | — | — | — | — | — | — | — | — | — | — | Within the scope of our methods |
| C | 0.16 | 0.7 | 1.4 | 0.017 | 0.004 | 0.700 | 0.005 | — | — | — | — | — | — | — | — | — | — | Within the scope of our methods |
| D | 0.25 | 0.02 | 1.8 | 0.019 | 0.002 | 0.041 | 0.004 | — | — | — | — | — | — | — | — | — | — | Within the scope of our methods |

TABLE 1-continued

| | Elemental composition (% by mass) | | | | | | | | | | | | | | | | |
|---|---|---|---|---|---|---|---|---|---|---|---|---|---|---|---|---|---|
| Steel | C | Si | Mn | P | S | Al | N | Cr | Mo | V | Ni | Cu | Ti | Nb | B | Ca | REM | Note |
| E | 0.10 | 1.3 | 2.1 | 0.025 | 0.003 | 0.036 | 0.004 | — | — | — | — | — | — | — | — | — | — | Within the scope of our methods |
| F | 0.20 | 0.3 | 1.6 | 0.013 | 0.005 | 0.028 | 0.005 | — | — | — | — | — | — | — | — | — | — | Within the scope of our methods |
| G | 0.13 | 1.3 | 1.2 | 0.008 | 0.006 | 0.031 | 0.003 | 0.60 | — | — | — | — | — | — | — | — | — | Within the scope of our methods |
| H | 0.16 | 0.6 | 2.7 | 0.014 | 0.002 | 0.033 | 0.004 | — | 0.3 | — | — | — | — | — | — | — | — | Within the scope of our methods |
| I | 0.08 | 1.0 | 2.2 | 0.007 | 0.003 | 0.025 | 0.002 | — | — | 0.1 | — | — | — | — | — | — | — | Within the scope of our methods |
| J | 0.12 | 1.1 | 1.9 | 0.007 | 0.002 | 0.033 | 0.001 | — | — | — | 0.5 | — | — | — | — | — | — | Within the scope of our methods |
| K | 0.10 | 1.5 | 2.7 | 0.014 | 0.001 | 0.042 | 0.003 | — | — | — | — | 0.3 | — | — | — | — | — | Within the scope of our methods |
| L | 0.10 | 0.6 | 1.9 | 0.021 | 0.005 | 0.015 | 0.004 | — | — | — | — | — | 0.05 | — | — | — | — | Within the scope of our methods |
| M | 0.16 | 1.2 | 2.9 | 0.006 | 0.004 | 0.026 | 0.002 | — | — | — | — | — | — | 0.03 | — | — | — | Within the scope of our methods |
| N | 0.09 | 2.0 | 2.1 | 0.012 | 0.003 | 0.028 | 0.005 | — | — | — | — | — | 0.02 | — | 0.001 | — | — | Within the scope of our methods |
| O | 0.08 | 1.0 | 2.2 | 0.010 | 0.002 | 0.046 | 0.001 | 0.30 | — | — | — | — | — | — | — | 0.003 | — | Within the scope of our methods |
| P | 0.07 | 1.3 | 2.9 | 0.019 | 0.004 | 0.036 | 0.003 | — | — | — | — | — | — | 0.04 | — | — | 0.002 | Within the scope of our methods |
| Q | 0.04 | 1.4 | 1.6 | 0.013 | 0.002 | 0.022 | 0.002 | — | — | — | — | — | — | — | — | — | — | Beyond the scope of our methods |
| R | 0.15 | 0.5 | 3.6 | 0.022 | 0.001 | 0.036 | 0.002 | — | — | — | — | — | — | — | — | — | — | Beyond the scope of our methods |
| S | 0.08 | 1.2 | 0.4 | 0.007 | 0.003 | 0.029 | 0.002 | — | — | — | — | — | — | — | — | — | — | Beyond the scope of our methods |

TABLE 2

| | | Annealing conditions | | | | | | | | |
|---|---|---|---|---|---|---|---|---|---|---|
| Galvanized steel sheet No. | Steel | Heating temperature (end-point temperature) (° C.) | Heating maintaining period (s) | Cooling rate (° C./s) | Cooling end-point (° C.) | Reheating temperature (° C.) | Reheating maintaining period (s) | Ms point (° C.) | Galvannealing | Note |
| 1 | A | 830 | 60 | 50 | 200 | 400 | 40 | 353 | Treated | Example |
| 2 | | 720 | 60 | 50 | 120 | 400 | 30 | 245 | Treated | Comparative Example |
| 3 | | 810 | 60 | 50 | 100 | 420 | 30 | 341 | Treated | Comparative Example |
| 4 | B | 780 | 90 | 80 | 180 | 430 | 60 | 318 | Treated | Example |
| 5 | | 780 | 5 | 80 | 70 | 430 | 60 | 184 | Treated | Comparative Example |
| 6 | | 800 | 60 | 80 | 50 | 400 | 60 | 329 | Treated | Comparative Example |
| 7 | C | 880 | 90 | 30 | 150 | 450 | 45 | 265 | Untreated | Example |
| 8 | | 880 | 90 | 5 | 120 | 450 | 45 | 196 | Untreated | Comparative Example |
| 9 | | 880 | 90 | 30 | 30 | 450 | 45 | 265 | Untreated | Comparative Example |
| 10 | D | 780 | 150 | 70 | 140 | 450 | 60 | 261 | Treated | Example |
| 11 | | 780 | 60 | 150 | 20 | 450 | 60 | 237 | Treated | Comparative Example |
| 12 | | 780 | 90 | 100 | 200 | 450 | 50 | 250 | Treated | Comparative Example |
| 13 | E | 850 | 75 | 80 | 170 | 400 | 30 | 297 | Treated | Example |
| 14 | | 850 | 60 | 80 | 160 | 300 | 60 | 279 | Treated | Comparative Example |
| 15 | | 830 | 75 | 80 | 160 | 650 | 60 | 279 | Treated | Comparative Example |
| 16 | | 850 | 75 | 80 | 40 | 400 | 30 | 297 | Treated | Comparative Example |
| 17 | F | 800 | 240 | 90 | 100 | 400 | 90 | 248 | Treated | Example |
| 18 | | 820 | 240 | 90 | 100 | 400 | 0 | 270 | Treated | Comparative Example |
| 19 | | 800 | 240 | 90 | 100 | 450 | 900 | 282 | Treated | Comparative Example |
| 20 | | 800 | 240 | 90 | 220 | 400 | 90 | 248 | Treated | Comparative Example |
| 21 | G | 850 | 60 | 100 | 150 | 500 | 30 | 279 | Treated | Example |
| 22 | | 850 | 60 | 100 | 20 | 500 | 30 | 279 | Treated | Comparative Example |

TABLE 3

| Galvanized steel sheet No. | Steel | Annealing conditions | | | | | | Ms point (° C.) | Galvan-nealing | Note |
|---|---|---|---|---|---|---|---|---|---|---|
| | | Heating temperature (end-point temperature) (° C.) | Heating maintaining period (s) | Cooling rate (° C./s) | Cooling end-point (° C.) | Reheating temperature (° C.) | Reheating maintaining period (s) | | | |
| 23 | H | 840 | 120 | 90 | 190 | 400 | 30 | 316 | Treated | Example |
| 24 | | 840 | 120 | 90 | 50 | 400 | 30 | 316 | Treated | Comparative Example |
| 25 | | 1000 | 120 | 150 | 200 | 350 | 30 | 380 | Treated | Comparative Example |
| 26 | I | 830 | 75 | 150 | 250 | 500 | 45 | 380 | Treated | Example |
| 27 | | 830 | 75 | 150 | 300 | 500 | 45 | 380 | Treated | Comparative Example |
| 28 | J | 800 | 45 | 80 | 180 | 400 | 20 | 319 | Untreated | Example |
| 29 | | 800 | 45 | 80 | 50 | 400 | 20 | 319 | Untreated | Comparative Example |
| 30 | K | 750 | 200 | 100 | 210 | 550 | 10 | 348 | Treated | Example |
| 31 | | 750 | 200 | 100 | 50 | 550 | 10 | 348 | Treated | Comparative Example |
| 32 | L | 780 | 120 | 150 | 230 | 400 | 60 | 342 | Treated | Example |
| 33 | | 780 | 120 | 150 | 300 | 400 | 60 | 342 | Treated | Comparative Example |
| 34 | M | 840 | 90 | 150 | 180 | 400 | 20 | 341 | Untreated | Example |
| 35 | | 840 | 90 | 150 | 280 | 400 | 20 | 341 | Untreated | Comparative Example |
| 36 | N | 820 | 60 | 50 | 160 | 450 | 90 | 308 | Treated | Example |
| 37 | | 820 | 60 | 50 | 50 | 450 | 90 | 308 | Treated | Comparative Example |
| 38 | O | 800 | 45 | 1000 | 220 | 450 | 150 | 389 | Treated | Example |
| 39 | | 800 | 45 | 1000 | 20 | 450 | 150 | 389 | Treated | Comparative Example |
| 40 | P | 860 | 30 | 30 | 200 | 450 | 30 | 377 | Treated | Example |
| 41 | | 860 | 30 | 30 | 320 | 450 | 30 | 377 | Treated | Comparative Example |
| 42 | Q | 800 | 60 | 30 | 200 | 400 | 60 | 328 | Treated | Comparative Example |
| 43 | R | 820 | 90 | 80 | 180 | 400 | 30 | 347 | Treated | Comparative Example |
| 44 | S | 820 | 75 | 80 | 20 | 400 | 120 | 121 | Treated | Comparative Example |

TABLE 4

| Galvanized steel sheet No. | Microstructure* | | | | Tensile characteristic values | | | | | | Note |
|---|---|---|---|---|---|---|---|---|---|---|---|
| | F Area fraction (%) | M + residual γ Area fraction (%) | Tempered M Area fraction (%) | Other | YS (MPa) | TS (MPa) | El (%) | YR (%) | TS × El (MPa · %) | λ (%) | |
| 1 | 80 | 4 | 16 | — | 389 | 670 | 32 | 58 | 21440 | 74 | Example |
| 2 | 90 | 2 | 2 | P | 502 | 605 | 25 | 83 | 15125 | 50 | Comparative Example |
| 3 | 82 | 1 | 17 | — | 518 | 682 | 26 | 76 | 17732 | 81 | Comparative Example |
| 4 | 72 | 5 | 18 | B | 553 | 801 | 27 | 69 | 21627 | 85 | Example |
| 5 | 85 | 4 | 5 | P | 628 | 730 | 22 | 86 | 16060 | 45 | Comparative Example |
| 6 | 70 | 1 | 29 | — | 632 | 810 | 23 | 78 | 18630 | 84 | Comparative Example |
| 7 | 77 | 7 | 14 | P | 715 | 979 | 21 | 73 | 20559 | 74 | Example |
| 8 | 82 | 2 | 8 | P | 767 | 913 | 17 | 84 | 15521 | 56 | Comparative Example |
| 9 | 77 | 1 | 22 | — | 792 | 990 | 18 | 80 | 17820 | 77 | Comparative Example |
| 10 | 59 | 9 | 32 | — | 788 | 1065 | 18 | 74 | 19170 | 71 | Example |
| 11 | 63 | 1 | 36 | — | 874 | 1040 | 15 | 84 | 15600 | 90 | Comparative Example |
| 12 | 61 | 23 | 12 | B | 783 | 1103 | 14 | 71 | 15442 | 40 | Comparative Example |
| 13 | 79 | 6 | 15 | — | 481 | 697 | 30 | 69 | 20910 | 75 | Example |
| 14 | 81 | 13 | 6 | — | 508 | 782 | 27 | 65 | 21114 | 46 | Comparative Example |
| 15 | 81 | 1 | 13 | P | 584 | 704 | 21 | 83 | 14784 | 72 | Comparative Example |
| 16 | 77 | 1 | 22 | — | 544 | 706 | 25 | 77 | 17650 | 80 | Comparative Example |
| 17 | 70 | 6 | 24 | — | 618 | 858 | 23 | 72 | 19734 | 78 | Example |
| 18 | 67 | 14 | 19 | — | 593 | 885 | 22 | 67 | 19470 | 56 | Comparative Example |
| 19 | 65 | 1 | 34 | — | 697 | 820 | 20 | 85 | 16400 | 85 | Comparative Example |
| 20 | 72 | 17 | 6 | B | 546 | 910 | 21 | 60 | 19110 | 27 | Comparative Example |
| 21 | 78 | 5 | 17 | — | 418 | 686 | 32 | 61 | 21952 | 78 | Example |
| 22 | 75 | 1 | 24 | — | 537 | 698 | 25 | 77 | 17450 | 79 | Comparative Example |

*F ferrite, M martensite, γ austenite, P pearlite, B bainite

TABLE 5

| Galvanized steel sheet No. | Microstructure* F Area fraction (%) | M + residual γ Area fraction (%) | Tempered M Area ratio (%) | Other | YS (MPa) | TS (MPa) | El (%) | YR (%) | TS × El (MPa · %) | λ (%) | Note |
|---|---|---|---|---|---|---|---|---|---|---|---|
| 23 | 55 | 10 | 35 | — | 812 | 1113 | 18 | 73 | 20034 | 72 | Example |
| 24 | 56 | 2 | 42 | — | 926 | 1129 | 15 | 82 | 16935 | 80 | Comparative Example |
| 25 | 5 | 8 | 87 | — | 1085 | 1220 | 9 | 89 | 10980 | 85 | Comparative Example |
| 26 | 64 | 9 | 27 | — | 629 | 861 | 24 | 73 | 20664 | 78 | Example |
| 27 | 64 | 23 | 11 | B | 563 | 923 | 22 | 61 | 20306 | 27 | Comparative Example |
| 28 | 71 | 6 | 23 | — | 594 | 825 | 25 | 72 | 20625 | 75 | Example |
| 29 | 74 | 2 | 24 | — | 676 | 834 | 21 | 81 | 17514 | 76 | Comparative Example |
| 30 | 62 | 8 | 30 | — | 671 | 958 | 23 | 70 | 22034 | 79 | Example |
| 31 | 60 | 1 | 39 | — | 804 | 980 | 19 | 82 | 18620 | 85 | Comparative Example |
| 32 | 73 | 8 | 19 | — | 589 | 830 | 23 | 71 | 19090 | 74 | Example |
| 33 | 74 | 14 | 7 | B | 566 | 885 | 22 | 64 | 19470 | 43 | Comparative Example |
| 34 | 40 | 7 | 53 | — | 935 | 1299 | 16 | 72 | 20784 | 82 | Example |
| 35 | 40 | 31 | 29 | — | 863 | 1370 | 15 | 63 | 20550 | 38 | Comparative Example |
| 36 | 80 | 4 | 16 | — | 587 | 839 | 26 | 70 | 21814 | 83 | Example |
| 37 | 77 | 1 | 22 | — | 715 | 851 | 22 | 84 | 18722 | 78 | Comparative Example |
| 38 | 60 | 6 | 34 | B | 583 | 845 | 24 | 69 | 20280 | 81 | Example |
| 39 | 60 | 0 | 40 | — | 680 | 861 | 20 | 79 | 17220 | 85 | Comparative Example |
| 40 | 58 | 6 | 36 | — | 801 | 1112 | 19 | 72 | 21128 | 83 | Example |
| 41 | 60 | 22 | 18 | — | 761 | 1171 | 18 | 65 | 21078 | 25 | Comparative Example |
| 42 | 91 | 1 | 8 | — | 363 | 471 | 35 | 77 | 16485 | 62 | Comparative Example |
| 43 | 15 | 9 | 76 | — | 1028 | 1224 | 12 | 84 | 14688 | 75 | Comparative Example |
| 44 | 93 | 1 | 4 | P | 245 | 335 | 45 | 73 | 15075 | 65 | Comparative Example |

*F ferrite, M martensite, γ austenite, P pearlite, B bainite

Example 2

The steels AA to AL having the elemental compositions shown in Table 6 were ingoted by a converter, made into slabs by a continuous casting process. Subsequently, the slabs were subjected to hot rolling at a finish temperature of 900° C. to give a thickness of 3.0 mm, cooled at a cooling rate of 10° C./s, and then wound up at a temperature of 600° C. Subsequently, after pickling, the slabs were subjected to cold rolling to give a thickness of 1.2 mm, and annealed on a continuous galvanizing line under the conditions shown in Tables 7. Thereafter, the steel sheets were immersed in a galvanizing bath at 460° C. to form a coating layer at a coating weight of 35 to 45 g/m$^2$, subjected to galvannealing treatment at 520° C., and cooled at a cooling rate of 10° C./s to make galvanized steel sheets 101 to 130. As shown in Table 7, some galvanized steel sheets were not subjected to galvannealing treatment. The galvanized steel sheets thus obtained were measured for the area fractions of ferrite, martensite, residual austenite, and tempered martensite, and the average crystal grain diameter of the second phase composed of martensite, residual austenite, and tempered martensite by the above-described methods. Further, JIS No. 5 tensile test specimens were cut out along and perpendicular to the rolling direction, and subjected to tensile test according to JIS Z 2241 to determine TS×El. Further, test specimens of 150 mm×150 mm were cut out, and subjected to hole expansion test three times according to JFS T 1001 (Japan Iron and Steel Federation standard) to determine the average hole expansion ratio λ(%), whereby the stretch-flangeability was evaluated. Further, according to the method described in "Tetsu To Hagane (Iron and Steel)," Vol. 83 (1997), p. 748, test specimens having a width of 5 mm and a length of 7 mm were cut out along and perpendicular to the rolling direction, and subjected to tensile test at a strain rate of 2000/s. The stress-true strain curve was integrated over the strain amount of 0 to 10% to calculate the absorption energy AE and AE/TS, whereby the anti-crush properties were evaluated.

The results are shown in Tables 8 and 9, indicating that all of our galvanized steel sheets satisfied TSE1≥19000 MPa·%, hole expansion ratio λ≥50, and AE/TS≥0.063, representing their high TS-El balance, excellent stretch-flangeability, and excellent anti-crush properties.

TABLE 6

| Steel | Elemental composition (% by mass) | | | | | | | | | | | | | | | | $Ac_1$ Transformation point (° C.) | $Ac_3$ Transformation point (° C.) | Note |
| | C | Si | Mn | P | S | Al | Ti | Nb | V | Cr | Mo | Ni | Cu | B | Ca | REM | | | |
|---|---|---|---|---|---|---|---|---|---|---|---|---|---|---|---|---|---|---|---|
| AA | 0.10 | 1.0 | 2.0 | 0.011 | 0.005 | 0.03 | 0.04 | — | — | — | — | — | — | — | — | — | 721 | 875 | Within the scope of our methods |
| AB | 0.08 | 0.8 | 2.5 | 0.010 | 0.002 | 0.04 | — | 0.02 | — | — | — | — | — | — | — | — | 710 | 851 | Within the scope of our methods |

TABLE 6-continued

| Steel | Elemental composition (% by mass) | | | | | | | | | | | | | | | | $Ac_1$ Transformation point (° C.) | $Ac_3$ Transformation point (° C.) | Note |
|---|---|---|---|---|---|---|---|---|---|---|---|---|---|---|---|---|---|---|---|
| | C | Si | Mn | P | S | Al | Ti | Nb | V | Cr | Mo | Ni | Cu | B | Ca | REM | | | |
| AC | 0.21 | 1.4 | 1.6 | 0.009 | 0.010 | 0.03 | — | — | 0.05 | 0.2 | — | — | — | — | — | — | 735 | 876 | Within the scope of our methods |
| AD | 0.14 | 2.0 | 1.8 | 0.008 | 0.004 | 0.60 | 0.10 | — | — | — | 0.3 | — | — | — | — | — | 684 | 896 | Within the scope of our methods |
| AE | 0.18 | 0.2 | 2.2 | 0.012 | 0.003 | 0.04 | 0.02 | 0.03 | — | — | — | 0.3 | — | 0.001 | — | — | 706 | 805 | Within the scope of our methods |
| AF | 0.09 | 1.2 | 1.4 | 0.009 | 0.001 | 0.30 | — | 0.02 | 0.02 | — | — | — | 0.2 | — | 0.003 | — | 742 | 920 | Within the scope of our methods |
| AG | 0.12 | 1.5 | 1.9 | 0.007 | 0.007 | 0.05 | 0.05 | — | 0.03 | 0.3 | — | — | — | — | — | 0.005 | 737 | 892 | Within the scope of our methods |
| AH | 0.08 | 0.9 | 2.3 | 0.012 | 0.004 | 0.03 | 0.10 | 0.03 | — | 0.03 | 0.1 | — | — | 0.002 | — | — | 718 | 863 | Within the scope of our methods |
| AI | 0.11 | 1.8 | 2.0 | 0.021 | 0.005 | 1.20 | 0.01 | 0.01 | — | — | — | — | — | — | 0.002 | 0.001 | 734 | 886 | Within the scope of our methods |
| AJ | <u>0.03</u> | 0.5 | 1.4 | 0.008 | 0.006 | 0.04 | 0.02 | — | — | — | — | — | — | — | — | — | 719 | 883 | Within the scope of our methods |
| AK | 0.07 | 0.2 | <u>0.2</u> | 0.009 | 0.004 | 0.05 | — | 0.03 | — | — | — | — | — | — | — | — | 728 | 899 | Within the scope of our methods |
| AL | 0.12 | 1.0 | 1.8 | 0.011 | 0.003 | 0.03 | — | — | — | — | — | — | — | — | — | — | 723 | 876 | Within the scope of our methods |

TABLE 7

| Galvanized steel sheet No. | Steel | Annealing conditions | | | | | | | $Ms$ point (° C.) | Galvannealing | Note |
|---|---|---|---|---|---|---|---|---|---|---|---|
| | | Heating rate (° C./s) | Heating temperature (end-point temperature) (° C.) | Heating maintaining period (s) | Cooling rate (° C./s) | Cooling end-point (° C.) | Reheating temperature (° C.) | Reheating maintaining period (s) | | | |
| 101 | AA | 25 | 820 | 60 | 50 | 180 | 400 | 60 | 329 | Treated | Example |
| 102 | | <u>5</u> | 820 | 60 | 50 | 160 | 400 | 60 | 309 | Treated | Comparative Example |
| 103 | | 25 | 820 | 60 | 50 | <u>260</u> | 400 | 60 | 329 | Treated | Comparative Example |
| 104 | AB | 25 | 780 | 90 | 80 | 200 | 450 | 90 | 354 | Untreated | Example |
| 105 | | 23 | <u>680</u> | 90 | 80 | 140 | 450 | 90 | 261 | Untreated | Comparative Example |
| 106 | | 15 | <u>920</u> | 90 | 80 | 220 | 450 | 90 | 378 | Untreated | Comparative Example |
| 107 | AC | 73 | 840 | 40 | 30 | 120 | 360 | 40 | 266 | Treated | Example |
| 108 | | 70 | 800 | <u>5</u> | 30 | 100 | 360 | 40 | 221 | Treated | Comparative Example |
| 109 | | 70 | 780 | 30 | 30 | <u>30</u> | 360 | 40 | 246 | Treated | Comparative Example |
| 110 | AD | 33 | 820 | 20 | 40 | 190 | 500 | 20 | 328 | Treated | Example |
| 111 | | 12 | 780 | 40 | <u>5</u> | 170 | 500 | 20 | 294 | Treated | Comparative Example |
| 112 | | 20 | 800 | 40 | 30 | <u>300</u> | 500 | 20 | 343 | Treated | Comparative Example |
| 113 | AE | 26 | 740 | 80 | 50 | 220 | 400 | 120 | 352 | Treated | Example |
| 114 | | <u>2</u> | 760 | 50 | 50 | 200 | 400 | 120 | 344 | Treated | Comparative Example |
| 115 | | 20 | 780 | 60 | 50 | 220 | <u>250</u> | 30 | 355 | Treated | Comparative Example |
| 116 | | 20 | 780 | 60 | 50 | 220 | <u>650</u> | 60 | 346 | Treated | Comparative Example |
| 117 | | 20 | <u>1000</u> | 60 | 150 | 200 | 350 | 60 | 390 | Treated | Comparative Example |

TABLE 7-continued

| | | Annealing conditions | | | | | | | | | |
|---|---|---|---|---|---|---|---|---|---|---|---|
| Galvanized steel sheet No. | Steel | Heating rate (° C./s) | Heating temperature (end-point temperature) (° C.) | Heating maintaining period (s) | Cooling rate (° C./s) | Cooling end-point (° C.) | Reheating temperature (° C.) | Reheating maintaining period (s) | Ms point (° C.) | Galvan-nealing | Note |
| 118 | AF | 30 | 790 | 30 | 25 | 150 | 420 | 60 | 285 | Treated | Example |
| 119 | | 7 | 810 | 30 | 25 | 100 | 420 | 60 | 285 | Treated | Comparative Example |
| 120 | | 20 | 800 | 40 | 25 | 160 | 450 | 900 | 285 | Treated | Comparative Example |
| 121 | | 25 | 780 | 40 | 25 | 140 | 400 | 0 | 270 | Treated | Comparative Example |
| 122 | AG | 100 | 810 | 40 | 30 | 190 | 470 | 20 | 316 | Treated | Example |
| 123 | | 5 | 800 | 40 | 30 | 160 | 470 | 20 | 297 | Treated | Comparative Example |
| 124 | AH | 30 | 820 | 60 | 150 | 240 | 380 | 60 | 378 | Untreated | Example |
| 125 | | 12 | 830 | 60 | 150 | 320 | 380 | 60 | 367 | Untreated | Comparative Example |
| 126 | AI | 34 | 820 | 90 | 70 | 250 | 440 | 60 | 409 | Treated | Example |
| 127 | | 20 | 840 | 90 | 70 | 100 | 440 | 60 | 398 | Treated | Comparative Example |
| 128 | AJ | 25 | 820 | 60 | 50 | 230 | 420 | 60 | 388 | Treated | Comparative Example |
| 129 | AK | 32 | 840 | 80 | 50 | 150 | 400 | 60 | 291 | Treated | Comparative Example |
| 130 | AL | 30 | 800 | 90 | 50 | 180 | 400 | 60 | 307 | Treated | Comparative Example |

TABLE 8

| | Microstructure* | | | | Tensile characteristic values | | | | | | |
|---|---|---|---|---|---|---|---|---|---|---|---|
| Galvanized steel sheet No. | F Area fraction (%) | M + residual γ area fraction (%) | Tempered M Area fraction (%) | Crystal grain diameter of second phase (μm) | TS (MPa) | El (%) | TS × El (MPa · %) | λ (%) | AE (MJ/m³) | AE/TS | Note |
| 101 | 75 | 5 | 20 | 2.2 | 845 | 24 | 20280 | 80 | 53 | 0.063 | Example |
| 102 | 78 | 4 | 18 | 4.5 | 830 | 25 | 20750 | 75 | 40 | 0.048 | Comparative Example |
| 103 | 75 | 12 | 13 | 2.4 | 870 | 24 | 20880 | 45 | 54 | 0.062 | Comparative Example |
| 104 | 71 | 5 | 24 | 2.0 | 882 | 22 | 19404 | 87 | 59 | 0.067 | Example |
| 105 | 85 | 1 | 1 | 1.8 | 750 | 20 | 15000 | 65 | 32 | 0.042 | Comparative Example |
| 106 | 62 | 7 | 31 | 4.2 | 856 | 22 | 18832 | 72 | 40 | 0.047 | Comparative Example |
| 107 | 65 | 7 | 28 | 1.4 | 1046 | 20 | 20920 | 82 | 72 | 0.069 | Example |
| 108 | 71 | 4 | 8 | 1.8 | 972 | 17 | 16524 | 70 | 52 | 0.053 | Comparative Example |
| 109 | 68 | 1 | 31 | 1.5 | 1010 | 17 | 17170 | 87 | 73 | 0.072 | Comparative Example |
| 110 | 70 | 7 | 23 | 2.1 | 1208 | 18 | 21744 | 74 | 79 | 0.065 | Example |
| 111 | 75 | 2 | 8 | 2.4 | 1070 | 16 | 17120 | 43 | 54 | 0.050 | Comparative Example |
| 112 | 67 | 21 | 12 | 2.4 | 1270 | 17 | 21590 | 24 | 89 | 0.070 | Comparative Example |
| 113 | 40 | 9 | 51 | 2.1 | 1228 | 16 | 19648 | 55 | 82 | 0.067 | Example |
| 114 | 44 | 8 | 48 | 5.5 | 1180 | 16 | 18880 | 58 | 53 | 0.045 | Comparative Example |
| 115 | 38 | 14 | 48 | 2.3 | 1340 | 14 | 18760 | 29 | 84 | 0.063 | Comparative Example |
| 116 | 43 | 2 | 55 | 1.9 | 1023 | 14 | 14322 | 36 | 62 | 0.061 | Comparative Example |
| 117 | 4 | 8 | 88 | 7 | 1280 | 8 | 10240 | 75 | 65 | 0.051 | Comparative Example |

*F ferrite, M martensite, γ austenite

TABLE 9

| Galvanized steel sheet No. | Microstructure* | | | | Tensile characteristic values | | | | | | Note |
|---|---|---|---|---|---|---|---|---|---|---|---|
| | F Area fraction (%) | M + residual γ area fraction (%) | Tempered M Area fraction (%) | Crystal grain diameter of second phase (μm) | TS (MPa) | El (%) | TS × El (MPa · %) | λ (%) | AE (MJ/m³) | AE/TS | |
| 118 | 85 | 4 | 11 | 2.0 | 742 | 28 | 20776 | 78 | 51 | 0.069 | Example |
| 119 | 85 | 4 | 11 | <u>3.4</u> | 725 | 29 | 21025 | 82 | 40 | 0.055 | Comparative Example |
| 120 | 85 | <u>1</u> | 14 | 2.3 | 693 | 25 | 17325 | 92 | 45 | 0.065 | Comparative Example |
| 121 | 86 | <u>12</u> | <u>2</u> | 2.1 | 773 | 26 | 20098 | 43 | 53 | 0.069 | Comparative Example |
| 122 | 72 | 7 | 21 | 1.2 | 1024 | 21 | 21504 | 65 | 73 | 0.071 | Example |
| 123 | 75 | 6 | 19 | <u>3.3</u> | 995 | 22 | 21890 | 70 | 53 | 0.053 | Comparative Example |
| 124 | 65 | 8 | 27 | 1.7 | 1286 | 15 | 19290 | 63 | 91 | 0.071 | Example |
| 125 | 69 | <u>18</u> | 13 | 2.5 | 1332 | 15 | 19980 | 23 | 97 | 0.073 | Comparative Example |
| 126 | 60 | 7 | 33 | 2.7 | 946 | 23 | 21758 | 82 | 61 | 0.064 | Example |
| 127 | 64 | <u>1</u> | 35 | 2.5 | 898 | 19 | 17062 | 95 | 55 | 0.061 | Comparative Example |
| 128 | 90 | 2 | <u>8</u> | 1.5 | 398 | 38 | 15124 | 68 | 19 | 0.047 | Comparative Example |
| 129 | 90 | 2 | <u>8</u> | 2.3 | 309 | 43 | 13287 | 63 | 13 | 0.042 | Comparative Example |
| 130 | 75 | 6 | 19 | <u>3.4</u> | 717 | 27 | 19359 | 70 | 35 | 0.049 | Comparative Example |

*F ferrite, M martensite, γ austenite

The invention claimed is:

1. A formable galvanized steel sheet, comprising, in terms of % by mass, 0.05 to 0.3% of C, 0.01 to 2.5% of Si, 0.5 to 3.5% of Mn, 0.003 to 0.100% of P, 0.02% or less of S, 0.010 to 1.5% of Al, and 0.01 to 0.2% in total of at least one element selected from Ti, Nb and V, the remainder being Fe and unavoidable impurities, having a microstructure composed of, in terms of area fraction, 20 to 87% of ferrite, 3 to 10% in total of martensite and residual austenite, and 10 to 60% of tempered martensite, a first phase composed of the ferrite, and a second phase composed of the martensite, residual austenite, and tempered martensite having an average crystal grain diameter of 3 μm or less, and having a ratio of absorption energy AE to tensile strength TS (AE/TS) not less than 0.063 as a result of heat applied at a temperature of 500° C. to $Ac_1$ transformation point at an average temperature rising rate of 10° C./s or more.

2. The formable galvanized steel sheet of claim 1, further comprising at least one composition selected from the group consisting of (A) to (C):

(A): at least one element selected from the group consisting of, in terms of % by mass, 0.005 to 2.00% of Cr, 0.005 to 2.00% of Mo, 0.005 to 100% of Ni, and 0.005 to 2.00% of Cu;

(B): in terms of % by mass, 0.0002 to 0.005% of B; and (C): at least one element selected from the group consisting of, in terms of % by mass, 0.001 to 0.005% of Ca and 0.001 to 0.005% of REM.

3. The formable galvanized steel sheet of claim 1, wherein the galvanized steel sheet is a galvannealed steel sheet.

4. The formable galvanized steel sheet of claim 2, wherein the galvanized steel sheet is a galvannealed steel sheet.

5. A method of producing a formable galvanized steel sheet, comprising:

subjecting a slab having an elemental composition of claim 1 to hot rolling and cold rolling thereby making a cold rolled steel sheet;

subjecting the cold rolled steel sheet to annealing including heating the steel sheet in a temperature range from 500° C. to the $Ac_1$ transformation point at an average temperature rising rate of 10° C./s or more;

heating and maintaining the steel sheet in a temperature range from the $Ac_1$ transformation point to ($Ac_3$ transformation point+30° C.) for 10 seconds or more;

cooling the steel sheet to a temperature range from (Ms point–100° C.) to (Ms point–200° C.) at an average cooling rate of 10° C./s or more;

reheating and maintaining the steel sheet in a temperature range from 350 to 600° C. for 1 to 600 seconds; and subjecting the annealed steel sheet to galvanizing treatment.

6. The method of claim 5, wherein the average temperature rising rate from 500° C. to the $Ac_1$ transformation point is 20° C./s or more.

7. The method of claim 5, wherein the galvanizing treatment is followed by galvannealing treatment.

* * * * *